Patented Aug. 25, 1931

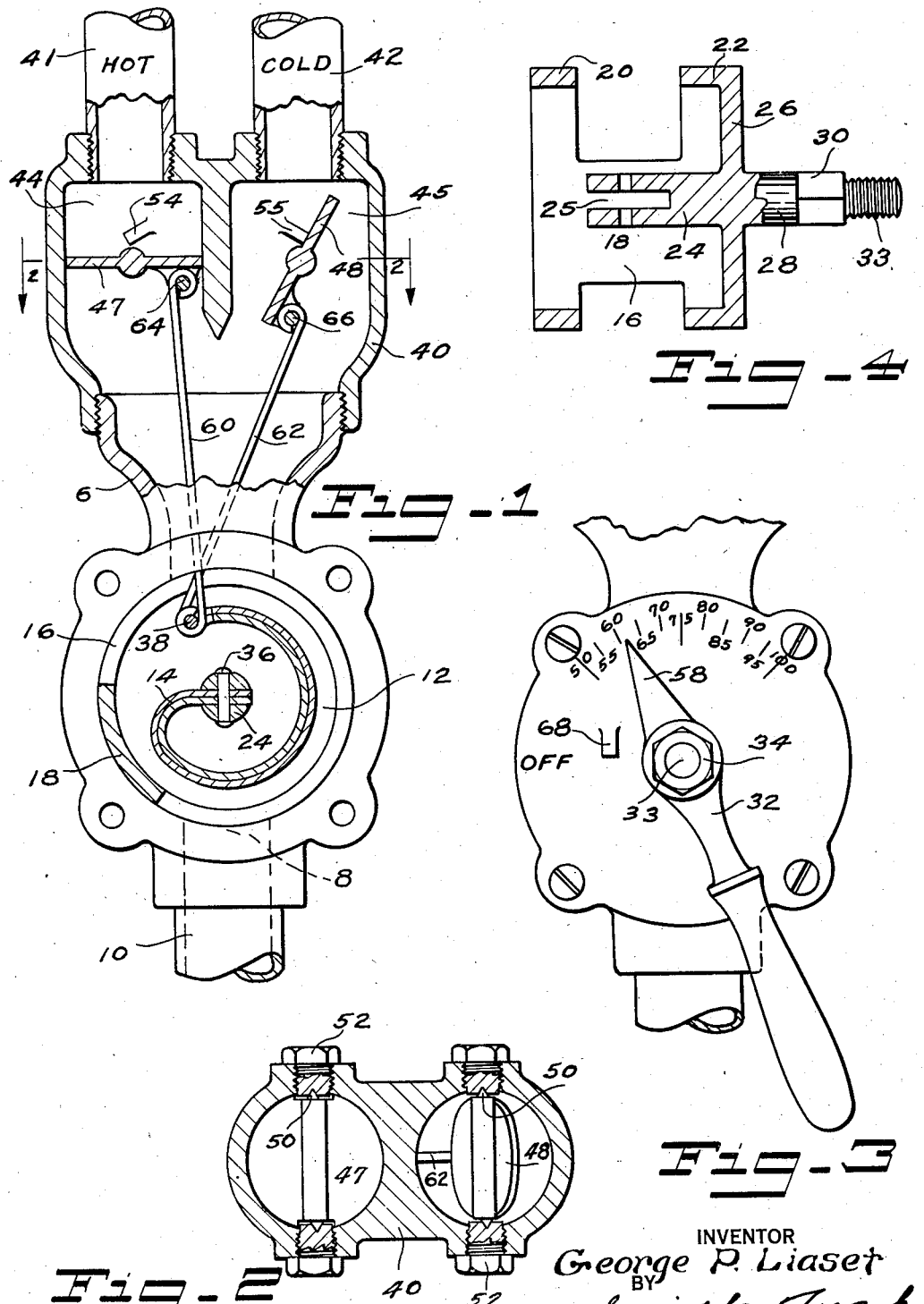

1,820,145

UNITED STATES PATENT OFFICE

GEORGE P. LIASET, OF SEATTLE, WASHINGTON

THERMOSTATIC VALVE

Application filed November 13, 1929. Serial No. 406,769.

My invention relates to the art of plumbing fixtures and more particularly to a valve which by the inclusion of a thermostatic element makes it possible to maintain any given water temperature. In the past for instance, if it was desired to take a shower bath, the hot and cold water valves were each hand-operated to give the desired temperature. However, the temperature of the hot water in practically any system will vary as the hot water standing in the pipes for instance, will not have the same temperature as the water at the heating source, and as a result even though the temperature be properly adjusted at the start after the standing water has been drained off, change in temperature is sure to result. This is inconvenient to say the least and has in the past accounted for some very serious burns, it being a well known fact that often 'mes the human body cannot tell when a sudden change of temperature strikes it, whether the water is very cold or very hot, the risk being that the nerve response is identical in both cases and our daily papers give many accounts of people seriously scalded before they actually realized what had happened.

Another fault of the two-valve system, particularly where several showers are fed from the same source, is that opening a valve in, for instance, the cold water line, will decrease the cold water pressure as delivered to the shower in question; the hot water pressure can be assumed to be constant. As a result much more hot water is discharged than had been intended by the original setting of the valves. This is a very common fault and while not as dangerous as the former, is a source of great annoyance. It is to overcome the objections recited that I have provided my thermostatically controlled dual valve.

The principal object of my invention is to provide means whereby cold and hot water streams may be blended together to produce a stream of any desired temperature.

A further object is to provide a thermostatic valve as above recited which will in addition provide a positive shutoff for both streams.

A further object is to provide means whereby a thermostatic element is adapted to control a cold water valve and a hot water valve and which may be set to maintain the blended stream of water at any desired temperature.

Other and more specific objects will be apparent from the following description taken in connection with the accompanying drawings, wherein Figure 1 is an elevation of my complete valve, certain parts being shown in sections and with the cover of the thermostat chamber removed.

Figure 2 is a cross-sectional view taken on the line 2—2 of Figure 1.

Figure 3 is a fragmentary elevation showing the cover of the thermostat chamber in place.

Figure 4 is a cross-sectional view through the shutoff valve which has combined with it the post to which the thermostatic unit is fastened.

Referring to the drawings throughout which like reference numerals indicate like parts, numeral 6 designates the lower member which at its lower end is provided with a discharge opening 8, which is adapted to accommodate any standard pipe fitting, as the discharge pipe 10. The central portion of member 6 is enlarged to form a chamber 12, which will accommodate the thermostatic unit 14 and the shutoff valve member 16. The valve 16 is more completely illustrated in Figure 4 and may be briefly described as having the cover or closing member 18 which is supported by circular rings 20 and 22.

As a matter of convenience I have made as part of the same piece the thermostat support member 24, which is bifurcated at 25 to accommodate the theremostatic unit. A solid wall 26 is provided at one end to join the valve member to the operating shaft which has the round bearing portion 28 and a flattened portion 30 which is adapted to engage the operating handle 32. A threaded portion 33 is provided to accommodate the nut 34 which secures the operating handle 32 in place. Disposed within the slot 25 of member 24 by means of the pin 36 is a thermostatic unit 14. This I prefer to make of two metals joined together, having different coefficients of expansion although I believe it will be understood that any standard type of thermostatic element, even to the accordion types, would be usable. The exact shape of the element is rather immaterial, provided it will give an up and down movement to the pivot point 38 and will also be of such a character that it will spring a small amount when it is desired to turn the valve 16 to the shutoff position.

In Figure 1, I have shown a form which has proven satisfactory, as the spiral shape shown permits the element to spring and enable the closing of discharge opening 8. As a matter of convenience I have shown another member 40, joined to member 6 by a screwed joint. The exact construction is of no real importance except that it must be so arranged that the various parts of the device may be easily assembled. At the upper end of member 40 I have shown two pipes 41 and 42, which discharge into cylindrical chambers 44 and 45. Pivoted within the cylindrical chambers, as will be more clearly understood from Figure 2, are the butterfly valves 47 and 48 respectively. These valves are provided with pivot points 50 which are engaged by the plug fittings 52 which may be adjusted so as to give the proper tension. In order to prevent the valves opening too far so that the linkage may operate in the reverse direction, I provide the stops 54 and 55 respectively. Links 60 and 62 connect the common pivot point 38 and the pivot points 64 and 66 of the valves 47 and 48 respectively. I have shown these as heavy wire bent to form eyes about the pivot points. With the type of thermostat shown the solid rods will operate satisfactorily. If however, a thermostatic unit which has no spring action is used, it will be necessarily to form a coil within the body of the links so as to provide for an elongation of the links when it is desired to place the valve in the shutoff position.

Method of operation

In operating my device which will normally be left with the pointer 58 of the handle 32 at the off position when it is desired to bathe, for instance the operator may determine that he would like to take a cold bath with a temperature of say 62 degrees, he moves the pointer 58 from the off position upwardly until it engages the dial readings. The valve member 18 uncovers the discharge 8 as soon as pointer 58 comes to the first graduation. He continues moving the operating handle 32 until pointer 58 rests at the desired temperature. This moves the pivot 38 so that the butterfly valves are in the position as indicated in Figure 1 wherein the cold water is opened and the hot water closed. If however, the cold water is at a temperature of less than 62 degrees, the thermostatic unit will cause point 38 to travel upwardly and to the right thus opening valve 47 slightly and partially closing valve 48, until the mixture of the two streams gives a resulting temperature of 62 degrees where it will be maintained. When through using the bath for instance the operator swings handle 32 back to the off position where the discharge opening 8 is sealed and the low lug 68 will prevent the spring of the mechanism from moving handle 32.

The foregoing description and the accompanying drawings clearly disclose a preferred embodiment of my invention but it will be understood that this disclosure is merely illustrative and that such changes in the invention may be made as are fairly within the scope and spirit of the following claims.

What I claim is:

1. In a plumbing fixture of the class described a body member; a cold water inlet; a hot water inlet; a cold water control valve; a hot water control valve; a water mixing chamber; a thermostatic element in said chamber; a pivot point on the free end of the thermostatic element; links connecting the pivot point with both the hot and cold water control valves; means for mounting the thermostatic element capable of varying the position of the pivot point so as to vary the relative openings of the hot and cold water valves; an opening for discharging the blended hot and cold water and a valve controlled by the same handle by which the pivot point is adjusted, adapted to close the discharge opening.

2. In a plumbing fixture of the class described a body member; a cold water inlet; a hot water inlet; a cold water control valve; a hot water control valve; a water mixing chamber; a thermostatic element in said chamber adapted to vary the relative openings of the hot and cold water valves; a pivot point on the free end of the thermostatic element; links connecting the pivot point with both the hot and cold water control valves; revolvable means for mounting the thermostatic element capable of varying the position of the pivot point so as to maintain a constant relationship between the openings of the hot and cold water valves, and an opening for discharging the blended hot and cold water.

3. In a plumbing fixture of the class described a body member; a cold water inlet; a hot water inlet; a cold water control valve; a hot water control valve; a water mixing chamber; a thermostatic element in said chamber adapted to vary the relative openings of the hot and cold water valves; a pivot point on the free end of the thermostatic element; links connecting the pivot point with both the hot and cold water control valves;

revolvable means for mounting the thermostatic element capable of varying the position of the pivot point so as to maintain a constant relationship between the openings of the hot and cold water valves, and an opening for discharging the blended hot and cold water and a valve controlled by the same handle by which the pivot point of the thermostat is adjusted, adapted to close the discharge opening.

4. In a plumbing fixture of the class described a body member; a cold water inlet; a hot water inlet; a cold water control valve; a hot water control valve; a water mixing chamber; a thermostatic element in said chamber; a discharge opening; a pivot point on the free end of the thermostatic element; links connecting the pivot point with both the hot and cold water control valves; a cylinder valve adapted to close said discharge opening having an axially disposed mounting for the said thermostatic element; a control handle for said valve; said mounting disposed that as it changes position it will change the position of the pivot point so as to vary the relative openings of the hot and cold water valves.

In witness whereof, I hereunto subscribe my name this 31st day of October, A. D. 1929.

GEORGE P. LIASET.